United States Patent [19]

Cornsweet

[11] 4,281,926

[45] Aug. 4, 1981

[54] METHOD AND MEANS FOR ANALYZING SPHERO-CYLINDRICAL OPTICAL SYSTEMS

[75] Inventor: Tom N. Cornsweet, Mission Viejo, Calif.

[73] Assignee: Rodenstock Instruments Corp.

[21] Appl. No.: 921,503

[22] Filed: Jul. 3, 1978

[51] Int. Cl.³ ............................................... G01B 9/00
[52] U.S. Cl. ....................................... 356/124; 250/236
[58] Field of Search ........................ 356/124, 125, 127; 250/234, 578, 236

[56] References Cited

U.S. PATENT DOCUMENTS

| | | | |
|---|---|---|---|
| 2,385,503 | 9/1945 | Glasser | 356/125 |
| 3,832,066 | 8/1974 | Cornsweet | 356/125 X |
| 3,981,589 | 9/1976 | Spitzberg | 356/125 X |
| 4,130,361 | 12/1978 | Humphrey | 356/127 X |

*Primary Examiner*—John K. Corbin
*Assistant Examiner*—Bruce Y. Arnold
*Attorney, Agent, or Firm*—Grover A. Frater

[57] ABSTRACT

An improved method for finding the refractive properties of lenses includes placement of the test lens in an optical system such that its image lies in a plane at which light passes through at least two spaced areas. The beams passing through those areas fall on respectively associated targets. The amount and angle of separation and the positions of the points of impingement of the beams are used to find the magnitude of spherical lens power component and magnitude, and angle of any prismatic and cylindrical power components. That information can be found by computation or by the use of means for displacing the targets and light source until the beams strike reference points on the targets. The amount of target or source displacement is then a function of the magnitude of the several optical powers and the orientation of the prismatic and cylindrical powers.

An apparatus for practicing the method is described. It accomplishes target and source displacement with servo-mechanisms.

23 Claims, 7 Drawing Figures

METHOD AND MEANS FOR ANALYZING SPHERO-CYLINDRICAL OPTICAL SYSTEMS

This invention relates to improvements in methods and apparatus for measuring the refractive properties of lenses.

BAKCGROUND OF THE INVENTION

One of the basic and very important tasks in the practive of ophthalmology and optometry, and the rendering of their supporting services, is the measurement of the first order refractive properties of spectacle lenses. At least three properties are usually required to be known. They can be expressed as the spherical power of the lens, its cylindrical power, and its prismatic power. Cylindrical and prismatic powers are accounted for by cylindrical and prismatic components in the plane perpendicular to the principal axis of a lens, which components are superimposed on an otherwise spherical shape.

Spherical power is defined as the inverse of the focal length along the principal axis, and is independent of lens rotation about that axis. However, that is not true of prismatic power and cylindrical power. Their effects vary as the lens is rotated about its axis. Thus, in addition to the three powers, the orientation of prismatic power and the orientation of cylindrical power must be determined. Accordingly, the value of at least five variables must be determined to define the first order refractive properties of a lens. Instruments by which those properties can be determined are called "lensmeters." Most modern lensmeters look like and are used in a way similar to a microscope. A lens whose properties are to be measured is placed in a holder and the operator looks through an eyepiece while adjusting knobs to bring various images into focus. The method is subjective. It is subject to errors and it is slow.

Many millions of spectacle lens are tested annually, and there is an urgent need for a lensmeter that provides accurate test data in shorter time. Moreover, there is a need for a low cost lensmeter which relatively unskilled operators can operate to make accurate and reliable measurements.

The availability of light sensors capable of receiving a test light beam and converting it to an electrical signal gives rise to the possibility that lens testing can be made automatic, or partially automatic, and a number of schemes for doing that have been described and attempted. Some of those schemes involve locating the focus of the test lens and, in the case of an astigmatic lens, they involve attempts to determine the axis of the astigmatism. Other schemes involve directing parallel rays of light through different regions of a test lens and determining and comparing the differences in the directions of those beams after passing through the test lens. The apparatus for the detection of beam direction is relatively complex.

SUMMARY OF THE INVENTION

It is an object of this invention to provide an improved method and improved means by which to determine the refractive properties of lenses. It is an object to provide such a method and apparatus which can provide an accurate measurement of refractive properties in a minimum time. It is another object to provide a method which lends itself to automatic measurement of lens refraction, and it is an object to provide a novel, and relatively inexpensive apparatus by which that method can be practiced automatically.

These and other objects and advantages of the invention which will hereinafter appear are provided in part by dividing a light beam into at least two groups of rays at a plane in an optical system at which there appears an image of the lens to be tested. The two groups of rays are chosen at points on the image that lie at known disstances on opposite sides of the optical axis of the instrument. The positions at which the two beams strike a target, after passing through a test lens, relative to the position at which they strike the target in the absence of a test lens, are a function of the spherical, cylindrical and prismatic powers of the test lens and the angular orientation of any cylindrical and prismatic components. Measurement of the degree and the direction of displacement of the light beams at the target can be used to determine or compute the value of the five parameters. If the target is arranged with sensors that can detect the presence or absence of the beam in different areas of the target, then the detectors can be repositioned in the target plane or elements of the system can be moved to positions such that each light beam falls on an associated detector at some particular reference point. That repositioning can be accomplished using servomechanisms. The magnitude of each of the five parameters can be determined by moving the sensors in a plane perpendicular to the primary axis of the system and rotating them about the principle axis. In still other forms of the invention, the test lens, the beam forming and selection elements, and the light source are moved relative to one another and to the sensors to accomplish an equivalent result.

IN THE DRAWINGS

DESCRIPTION OF THE PREFERRED EMBODIMENT

Figure 1:
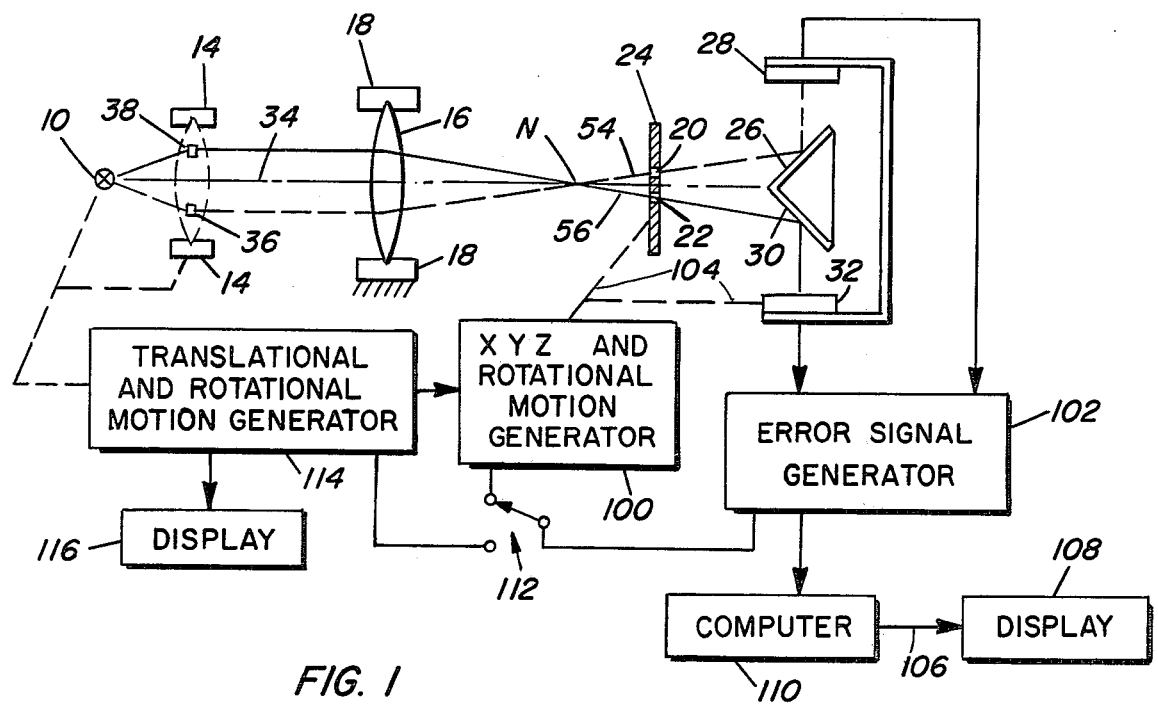
FIG. 1 is a schematic diagram of an apparatus which embodies the invention.
Figure 2:
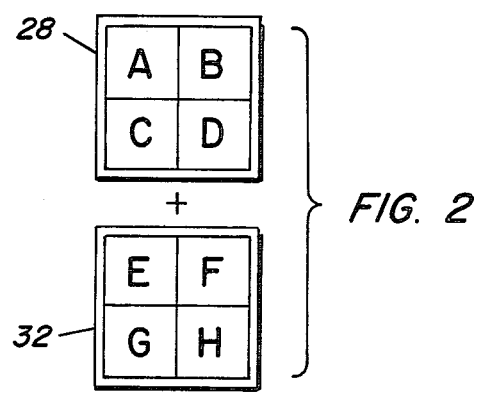
FIG. 2 is a schematic drawing of the photosensor arrays that are employed in the apparatus of FIG. 1.

An apparatus made according to the invention, and by which the method of the invention may be practiced, is illustrated in FIG. 1. It is shown schematically to include a light source 10 of any convenient kind, but advantageously a light emitting diode. The light from such a source is nearly monochromatic. The rays pass through a test lens holder 14 and then through a spherical lens 16 mounted in a holder 18. Subsequently, the rays from source 10 pass through two small apertures 20 and 22 in a mask 24. The ray of light that passes through aperture 20 strikes the surface of a mirror 26 and is reflected upwardly to the light sensitive surface of a light detection means for detecting the presence of light. The light detection means is capable of detecting on which portion of its surface the light beam impinges. A preferred form of light sensor is depicted in FIG. 2 and will be described below.

Light passing through aperture 22 of mask 24 strikes the surface of a second mirror 30 and is reflected downwardly to the surface of a second light detection means 32 which, in preferred form, is similar to the light detector 28.

The spherical lens 16, here called a focusing lens, has a principal axis indicated by the line 34. The light source 10 lies on that axis. The focusing lens 16 forms an image of the source 10 at position (N). The two apertures 20 and 22 in mask 24 are spaced at points equidistant from the principal axis. That axis extends through the juncture of the plane of mirror 26 with the plane of mirror 30. Those planes are perpendicular to one another in this preferred embodiment, and the two planes extend at like angles from the principal axis. The surfaces of light detectors 28 and 32 lie in parallel planes, in this embodiment, and those planes are parallel to the axis line 34 on which the plane of mirrors 26 and 30 intersect.

The test lens holding means, represented in this embodiment by holders 14, is arranged so that the test lens will be held at a distance from the focusing lens 16 such that its image appears in the plane of mask 24. Thus, the test lens and the mask 24 lie at conjugate points relative to lens 16.

The perforations 20 and 22 may be circular or rectangular. In the preferred form illustrated, they are square. The relationship that the image of those apertures is located at the position of the test lens is indicated schematically in FIG. 1 by the two squares, 36 and 38. The apparatus is intended, primarily, for use in measuring the optical properties in spectacle lenses and contact lenses, and the holding means, here holder set 14, is arranged so that it will hold a spectacle lens or contact lens.

The use of a focusing lens and the placement of the test lens and the mask with its apertures at conjugate points is one of the features of the invention. By that feature, an image of at least two points, at the area of interest of the test lens, is formed at the two, or more, apertures of the mask 24. Inclusion of that feature greatly shortens the time required to complete a test. Time saving is especially important when included as a step in the lens manufacturing process and in spectacle lens fitting.

The means for sensing the presence of the light beams passing through the apertures 20 and 22 may have a number of forms, but in the preferred form they need to be a type that provides a signal which indicates which portion of the sensor is being subjected to light. In the preferred form of the invention, the light sensing means is one which will provide a signal indicating whether or not the light beam that strikes its surface falls exactly upon its center. Moreover, it is preferred that the sensor be one which will provide a signal to indicate which portion of the surface of the sensor is illuminated if the light does not fall precisely on its center.

If the light sensor is one which provides an output from which it can be determined exactly on what portion of the sensor the light beam has fallen, it is possible to utilize that output information to calculate the spherical power and the amount and the orientation of prismatic and cylindrical powers.

However, it is another feature of the invention to provide a determination of the spherical, prismatic, and cylindrical power of test lenses with little calculation. That is accomplished in the invention by the use of servo-mechanisms which reposition and reorient one or more of the test lens, the source, the beam forming elements and the light sensors, to cause the beams to be focused along selected lines and at selectd points on the sensors. In the system shown relative movement of all of those elements is possible and movement of any one can be selected. The amount of movement of those elements required to achieve impingement of the light beams on the selected points of the sensors, is a direct measure of the several powers of the lens. Alternatively, a combination of servo-mechanism action and calculation can result in determination of test lens powers with a reduced amount of calculation, and, accordingly, reduced computing capacity than is required in a system that relies on computation alone.

Figure 3:
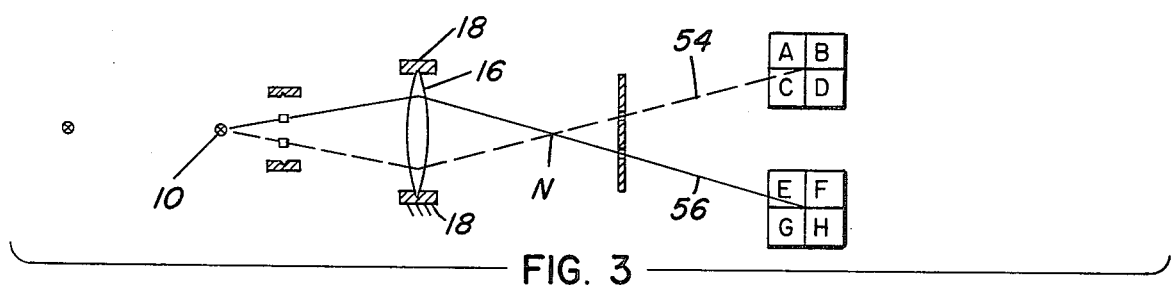
FIG. 3 is a diagram illustrating the operation of the apparatus of FIG. 1 in the absence of a test lens.

It will facilitate understanding of the servomechanism and display and computer system depicted in FIG. 1 if an examination is made of the operation of the optical portion of the apparatus. That operation is depicted schematically in FIGS. 3 through 7. Each of those figures includes one or more representations of the light sensors 28 and 32 of FIG. 2. FIG. 3 depicts the optical condition in FIG. 1 in the absence of a test lens when the sensors 28 and 32 are positioned such that light from source 10, after passing through lens 16, is divided at apertures 20 and 22 into two rays 54 and 56 which impinge upon light sensors 28 and 32, respectively. (The reflections for mirrors 26 and 30 have been ignored for simplicity). Beam 54 impinges on sensor 28 at the juncture of segments, A, B, C, and D such that the output signal from each of those four sensors is equal to the output of the others, or such that the signals have an amplitude relation which indicates that the light beam falls equally on the four segments. Similarly, light sensing means 32 is positioned such that beam 56 strikes equally on segments E. F, G, and H of that sensor. The four sensors provide output signals which, by their relative magnitude, indicate that the beam 56 has struck the sensor at the juncture of its four segments. The apertures 20 and 22 are positioned relative to one another and relative to the sensor arrays 28 and 32 such that the light beam 54 falls on the line that separates segments C, D from segments B, D. It also falls on the line that separates segments A, B from segments C, D. Similarly, beam 56 strikes the sensor 32 on the line that separates segments E, G from segments F, H, and it also falls on the line that separates segments E, F from segments G, H.

When the sensors are in the position represented in FIG. 3, they are in "home" position. Whatever their position, if the light beams strike the juncture of the four segments of their respective sensors, the beams are said to be in "reference" position. It will be apparent that the representation of FIG. 3 is only schematic, because the sensor arrays 28 and 32 have been turned at right angles to the position that they actually occupy as illustrated in FIG. 1. Further, the light source 10 has been reproduced at the left side of the figure.

Figure 4:
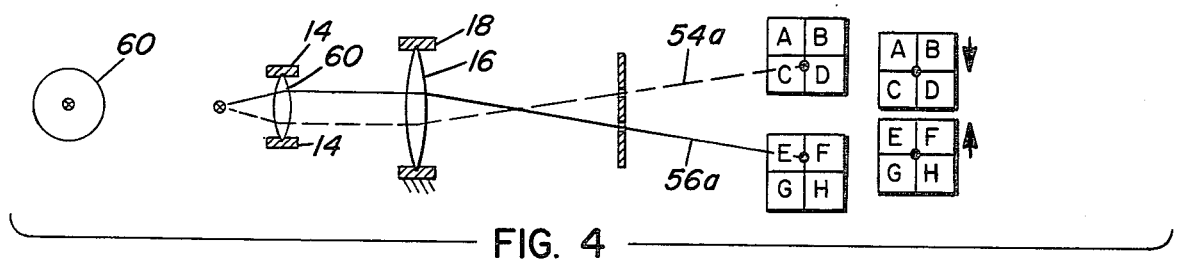
FIG. 4 is a diagram illustrating the operation of the apparatus when used to measure a spherical lens whose primary axis is coincident with the primary axis of the testing apparatus.

Similarly, light source 10 is reproduced at the left in FIG. 4 where it is shown to lie on the principal axis of a test lens 60. The optical system is reproduced at the right in FIG. 4 except that this time it includes the test lens 60 which, it is assumed, exhibits only spherical power and no prismatic or cylindrical power. Inclusion of the test lens 60 between source 10 and the focusing lens 16 alters the path of light rays such that the beams that are directed through apertures 20 and 22 no longer impinge upon the sensors 28 and 32 at the juncture of their respective four segments as was in the case of FIG. 3.

The point at which light beam 54a impinges upon the upper sensor 28, and which is represented by the black dot, is below the line that separates segments A, B from segments C, D. On the other hand, light beam 56a strikes sensor 32 at a point above the line that separates segments E, F from segments G, H. In practice, some light will fall upon all four segments of both sensor arrays, as a consequence of which there will be an output from all four segments of both arrays. Using those several signal amplitudes, it is possible to calculate the degree in which the center of beams 54a and 56a have moved from the reference position that the beams 54 and 56 occupy in the absence of a test lens. That change in position is a direct measure of the spherical power of lens 60.

Another way in which the spherical power can be determined, and which is preferred, is to move the sensors 28 and 32 in the fashion suggested at the right in FIG. 4, until the light beam 54a strikes its reference point, equally upon all four segments, and so that the light beam 56a strikes its reference point, equally on all four segments E, F, G, H of sensor 32. If that is done, the amount of movement of the two sensor arrays that was required to accomplish that result is a direct measure of the spherical power of the lens 60.

Figure 5:
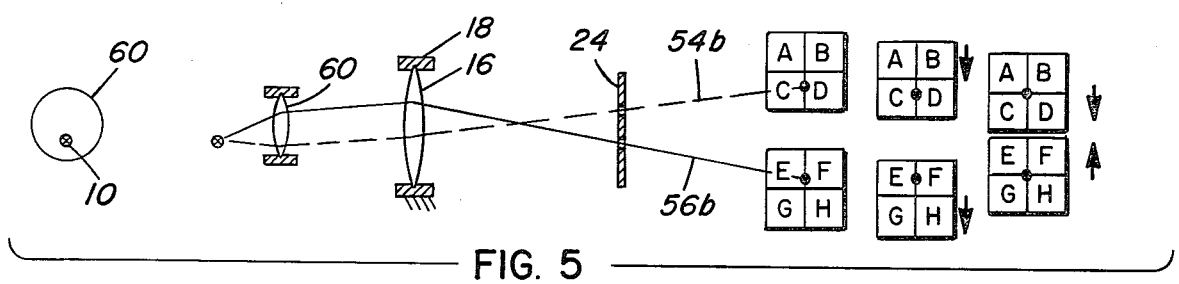
FIG. 5 is a diagram which illustrates operation of the test apparatus when used to measure a spherical lens whose principal axis is offset from the principal axis of the apparatus whereby to produce a combination of spherical and prismatic powers.

FIG. 5 is a schematic representation similar to that depicted in FIG. 4, except that the same lens 60 which exhibited only spherical power when arranged so that its principal axis was coincident with light source 10 has been moved so that the principal axis of the lens 60 is located above the principal axis of light source 10 and the remainder of the optical system. To move the spherical lens thus is equivalent to adding prismatic power to the spherical power of the lens at the point on the lens where its power is being measured. The effect of that is to alter the direction of rays 54b and 56b as they pass through apertures 20 and 22, respectively. As a result of the spherical power, the light beams have been brought closer together. In addition, the point at which both light beams impinge upon their respectively associated sensors has been translated over the surface of the sensors in FIG. 5. Lens 60 has the same power in FIG. 5 as it had in FIG. 4 so that the separation of the light beams is the same in FIG. 5 and in FIG. 4. However, both light beams are also translated downwardly in FIG. 5. Again, part of beams 54b and 56b will reach a portion of all segments of the two light sensor arrays. Accordingly, it is possible to determine the point of incidence of the center of each of the two beams and to calculate the spherical and the prismatic power exhibited by lens 60. However, as before, the sensors can be moved so that beam 54b impinges upon the reference point of the sensor array 32. That can be done in two conceptual steps as illustrated in FIG. 5 where the sensors 28 and 32 have been redrawn twice. First, both sensors are moved downwardly as indicated by the arrows associated with the middle set of sensor representations. They are moved downwardly until the point of impingement of beam 54b lies as much above the horizontal line that separates segments A, B from segments C, D as beam 56b lies below the line that separates segments E, F from segments G, H. The amount of the downward displacement of the two sensors that is required to accomplish that result is a direct measure of the prismatic power exhibited by lens 60 in view of its having been moved such that its principal axis is translated above the principal axis of the test apparatus. The sensor arrays having been so moved, the situation corresponds to what was depicted in FIG. 4, and it remains only to move the two sensors 28 and 32 in opposite directions so that the beam 54 is moved to its reference point at the junction of the four sensors of array 28 and so that the beam 56 impinges upon its reference point at the juncture of the four sensors of array 32. The amount of the change in separation between the two sensors 28 and 32 to accomplish that result is a direct measure of the spherical power of lens 60. In the preferred embodiment, the motions of the sensors will not be in the two conceptual stages shown in FIG. 5. The servo system will be connected so that it goes directly to the end point.

Figure 6:
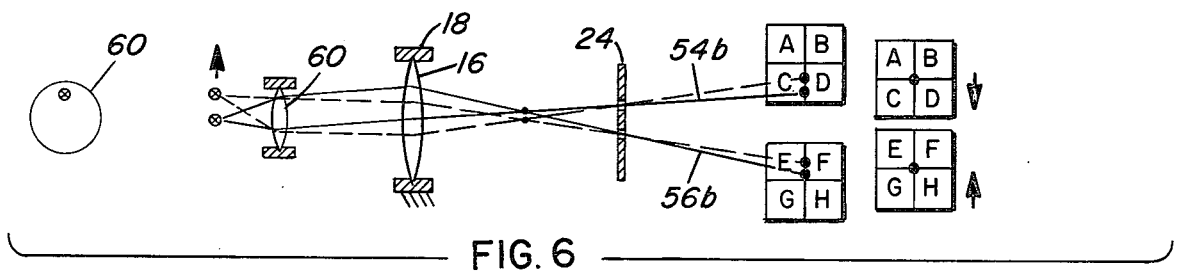
FIG. 6 is a diagram illustrating the condition depicted in FIG. 5 with the added step of finding the orientation of the prismatic power.

FIG. 6 shows a different, and mechanically preferable, way to accomplish the same objective as was illustrated in FIG. 5, that is to measure the spherical and prismatic components of a lens. The rays drawn as solid lines are the same as those in FIG. 5, for a spherical lens whose optical axis is above the axis of the instrument. In FIG. 5, the first conceptual step in bringing the spots back to the centers of their respective detectors was to move both detectors downward. In the embodiment of FIG. 6, the first conceptual step is not to move the detectors, but rather to move the light source upward. When the source is moved through the correct distance, the rays will be as indicated by the dashed lines, the spots being symmetrically offset with respect to their detectors. This reproduces the condition in FIG. 4 for all rays to the right of the unknown lens. If the spacing between the detectors is then reduced, as in FIG. 4 and as in step 3 of FIG. 5, the spots will be centered on their detectors. Then the distance between the detectors is the measure of spherical power and the distance through which the source moved is a measure of prism power. In other words, parallel movement of both detectors is replaced by movement of the source.

If the lens to be measured in FIG. 5 were placed so that its axis was above the plane of the drawing, then the spots falling on the two photo detectors would lie beneath the plane of the drawing. Prism power at that orientation can be measured exactly analogously to that shown in FIGS. 5 and 6, by moving both detectors downward in a direction perpendicular to the paper, corresponding to the embodiment in FIG. 5, or by moving the source upward above the plane of the paper, corresponding to the embodiment in FIG. 6.

In the general case, the axis of the lens to be measured might depart from the position of the axis of the instrument in both of the directions described above at the same time, and the effects of the resulting prismatic power could then be measured either by moving both detectors downward and into the plane of the paper, or by moving the source both upward and outward of the plane of the paper. The final position of the point lying halfway between the two detectors, or of the source, then indicates the power of the prismatic component and its orientation.

Obviously, the instrument will perform in the same fashion if the prism component is ground into the lens rather than by displacement of the lens from the optical axis.

Figure 7:
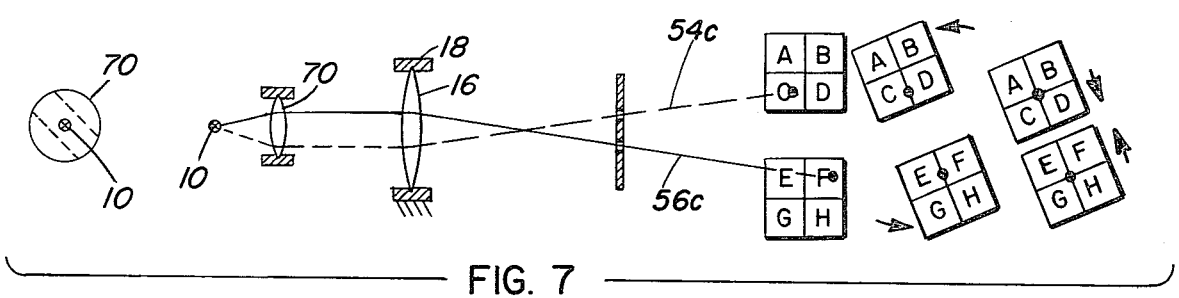
FIG. 7 is a diagram illustrating the operation of the apparatus of FIG. 1 when the test lens combines spherical and cylindrical power.

FIG. 7 illustrates the operation of the system of FIG. 1 when a lens exhibiting both spherical and cylindrical power is placed in the test lens holder 14. As illustrated at the left, in FIG. 7, it has been assumed that the test lens 70 has its primary axis coincident with the primary axis of the lensmaster. Light from source 10 passes first through the test lens 70 and then through the focusing lens 16. The light is divided into two beams 54c and 56c as it passes through apertures 20 and 22, respectively. As illustrated at the left of FIG. 7, the lens 70 is presumed to have been placed in the holder 14 so that the orientation of the axis of the cylindrical component of the lens lies at 135° to the horizontal. As illustrated above, the effect of the spherical component of lens 70 power is to make the two beams 54c and 56c separate so that beam 54c impinges on the sensor array 28 at a point below the reference point. Beam 56c is directed to a point above the reference point of its sensor array 32. The addition of cylindrical power changes the separation of the beams and, because the axis of cylindrical power is not coincident with the lines dividing the sensor arrays into right and left segment pairs, the light beams are moved one to one side and the other to the other side of that line. That is, the rays 20 and 22 fall one slightly above and the other slightly below the plane of the drawing.

As before, in a first step, the combination of sensor arrays and mask 24, or, alternately, the lens 70, is rotated about the optical axis of the instrument until the light beams impinge, in both sensor arrays, on the line that divides the arrays into right and left pairs. The amount of rotation is a direct measure of the orientation of the axis of cylindrical power.

In FIG. 7, there are three sets of sensor arrays. The one at the left illustrates where the beams strike the arrays when the array is in home position. The middle set of sensor arrays illustrate that cylindrical axis orientation may be determined by rotating the arrays and mask in the counterclockwise direction. The rightmost pair of sensors in FIG. 7 illustrates that it is then required only to change the separation of the two sensor arrays to position them such that the two light beams will impinge upon the reference points of their respectively associated arrays. The degree to which the sensors are moved together to accomplish that result is a direct measure of the spherical power of the lens 70 in the meridian of the axis of the cylindrical component, e.g. 135°.

Any cylindrical component may be thought of as having two mutually perpendicular axes, one parallel to the cylinder and the other perpendicular to it. In that context, the procedure just described determines the orientation and power of one of those axes. (Call that $P_1$.) If the power of the lens is then measured along the perpendicular axis ($P_2$), then $P_1 - P_2$ is the cylindrical power. To measure this power in the present embodiment, $P_1$ is first measured as above, and its value stored. Then, the mask and sensor array are rotated 90° about the principal axis of the apparatus, and the separation between the centers of the sensors that is required to center their respective spots of light is again measured. This is $P_2$. The value of $P_1 - P_2$ is then calculated and displayed as the cylindrical power.

It is possible, by limiting servo mechanism motion to one dimension at a time, to find power orientation and power value for each kind of power in sequence. However, it is possible, and it is preferred, to practice the invention by accomplishing all motion simultaneously, or at least so that one motion is not postponed until completion of another. To do that, separate servo mechanisms are provided by which to translate both sensor arrays in the same direction transversely with respect to the central axis of the lensmeter either upwardly or downwardly (which is called movement in the X direction) and from side to side (which is called movement in the Y direction) or, alternately, to move the source in the X and Y directions. Separation of the two sensor arrays can be accomplished by moving them toward or away from one another if they lie in the same plane. In the arrangement shown in FIG. 1, the effect of moving the arrays closer together is accomplished by moving both sensor sets 28 and 32 toward the mask 24. Conversely, the effect of moving the two sensors away from one another can be achieved by moving both sensor arrays away from the mask 24. Motion of the sensors toward and away from mask 24 is called motion in the Z direction. Note, however, that it is the optical equivalent of changing the sensor separation in the X-Y plane.

The X, Y and Z, and rotational motion generator 100 of FIG. 1, is a set of four position control servo mechanisms. The input to that unit is a set of output signals from the error signal generator 102. Those output signals are applied to the several servo mechanism units and are compared there with a reference signal equal to that which would be received by the error signal generator if beam 54 were perfectly centered on sensor 28 and beam 56 were perfectly centered on sensor 32. The error signal generator includes an internal means for finding the difference between the actual signal and the reference signal. The output of the X, Y, Z, and rotational motion generator is translation or rotational motion coupled, by a coupling means represented by dotted lines 104, to the sensors and to the mask 24, and to the source 10. Each servo mechanism accomplishes a translational or rotational motion until the signal furnished by the sensor arrays 28 and 32, after processing in the error signal generator 102 as hereinafter described, is equal to the reference signal. When the difference or error signal reaches zero, motion stops. A signal indicative of the amount of displacement by each of the servo mechanism systems is furnished by line 106 to a display unit 108 where the amount of displacement accomplished by each servo mechanism is displayed separately.

Alternatively, if the sensors provide accurate position readout, the signals developed in the error signal generator 102 are supplied directly to a computer 110. The computer processes that information according to some predefined algorithm, and the result of that computation is displayed in the display unit 108. Instead of being furnished only to the X, Y, Z, and rotational motion generator 100, as in the currently preferred embodiment, the output error signal can be applied by switch 112 to the generator 100 and to a rotational motion servo mechanism 114 which serves in the same fashion to translate and rotate one or more of the test lens holder set 14 and the source 10 and the mask. The amount of displacement provided by that servo mechanism is displayed on a display unit 116.

The error signal generator may have a variety of forms. In one of these forms, it comprises a series of adders and differential amplifiers that are interconnected to provide an output which depends upon the relative amplitude of voltages developed in the several segments of the two light sensor arrays 28 and 32. For the purpose of explanation, it is assumed that the letters A, B, C, D, E, F, G and H, correspond to the magnitude of the voltage resulting as an incident to impingement of light upon sensors A, B, C, D, E, F, G and H, respectively. On that basis error signal generator 102 furnishes output signals corresponding to:

| | |
|---|---|
| $((A + B) - (C + D)) + ((G + H) - (E + F))$ | spherical power; |
| $((A + B) - (C + D)) + ((E + F) - (G + H))$ | prismatic power in the X direction; |
| $((A + C) - (B + D)) + ((E + G) - (F + H))$ | prismatic power in the Y direction; |
| $((A + C) - (B + D)) + ((F + H) - (E + G))$ | cylindrical axis error. |

It can be shown that the rotational orientation of prismatic power is one function of all four equations and that orientation of the cylindrical power is another function of those four equations if measurements are made at two different angles. In the absense of the servo-mechanism, as in the prior art, those complex functions must be calculated, as well as the cylindrical power, which is not directly given by the above relationships. However, the use of a servo-mechanism to orient structural elements of the lensmeter so that the light beams fall upon one of the given lines, that is, the lines that separate the sensor arrays into left and right pairs, or upper and lower pairs, makes that complex calculation unnecessary. Once the light beams impinge upon those given lines, computation is greatly simplified. On the other hand, introduction of more servo-mechanism action, so that the sensors or source are moved until the light beams fall upon a given point in each array (i.e., the reference point) renders any calculation, other than scale changing and a simple subtraction unnecessary.

Although I have shown and described certain specific embodiments of my invention, I am fully aware that many modifications thereof are possible. My invention, therefore, is not to be restricted except insofar as is necessitated by the prior art.

I claim:

1. In a lens meter:
 (a) first and second spaced light detector means, each comprising a light detector having a plurality of light sensitive areas arranged side by side and capable of detecting presence of a light beam, for providing position signals indicating which areas of the light detector are subjected to a light beam;
 (b) a single point light source;
 (c) means for directing at least two light beams derived from said light source such that each beam is directed at a respectively associated one of said first and second light detection means;
 (d) means for interposing a lens to be tested between said light source and said means for directing two light beams derived from said light source such that said two light beams will have passed through different regions of the lens to be tested before being directed at said light detection means; and
 (e) means for recognizing when each of said light beams lies on a line extending between the areas of its respectively associated first and second light detection means.

2. The invention defined in claim 1 in which said means for interposing a lens to be tested comprises holding means for holding the test lens; and
 rotating means for rotating said holding means and said detector relative to one another until each of said light beams lies upon said line on the area of its respectively associated light detector.

3. The invention defined in claim 2 in which said means for directing two light beams comprises said single light source and a mask disposed between said light detection means and said source and which has two spaced apertures for the passage of light.

4. The invention defined in claim 1 in which said means for directing two light beams comprises said single light source and a mask disposed between said light detection means and said source and which has two spaced apertures for the passage of light.

5. In a lensmeter:
 (a) first and second light detector means, each comprising a light detector having an area capable of detecting the presence of a light beam, for providing position signals indicating which portions of the light detector area are subjected to a light beam;
 (b) means for receiving light from a single source after passage through a test lens and for directing at least two light beams such that each beam is directed at a respectively associated one of said first and second light detection means;
 (c) said light detection means including a means for recognizing when each of said light beams lies on a line extending through the area of its respectively associated light sensor;
 (d) each of said light detector means being capable of recognizing when its respectively associated light beams is directed toward a given region of its area; and
 (e) means responsive to said signals for producing relative displacement of said light detector means relative to said light beams toward a position in which said light beams are directed at a given position on their respectively associated light detectors.

6. The invention defined in claim 5 in which said means for receiving and directing at least two light beams further comprises a mask formed with two apertures for the passage of light;
 said invention further comprising means for holding a test lens in the path of said two light beams;
 said means for producing relative displacement further comprising means for producing relative rotational displacement between said light detectors and mask on the one hand and said lens holder on the other.

7. In a lens meter:
 (a) first and second light detector means, each comprising a light detector having an area capable of detecting the presence of a light beam, for providing position signals indicating which portions of the light detector area are subjected to a light beam;
 (b) means, including a light source, for directing at least two light beams such that each beam is directed at a respectively associated one of said first and second light detection means;

(c) said light detection means including a means for recognizing when each of said light beams lies on a line extending through the area of its respectively associated light sensor;

(d) each of said light detector means being capable of recognizing when its respectively associated light beam is directed toward a given region of its area; and (e) means, responsive to said signals, for producing relative displacement of said light detector means relative to said light beams toward a position in which said light beams are directed at a given position on their respectively associated light detectors;

(f) said means for producing relative displacement comprising means for moving both light detectors apart or together in a plane transverse to the direction of said light beam.

8. The invention defined in claim 7 in which said means for producing relative displacement further comprises means for rotating said light detectors together in said plane about a common axis.

9. In a lensmeter:
(a) first and second spaced light detection means, each comprising a light detector having areas capable of detecting the presence of a light beam for providing position signals indicating which of said areas of the detector are illuminated by a light beam and for indicating when the beam is directed toward a given portion of said area;

(b) light beam directing means for directing two light beams emanating from a single source, each at a respectively associated one of said first and second light detection means;

(c) lens holding means for interposing a test lens between said source and said light beam directing means in the path of the light in both of said light beams such that the direction of said beams is altered as a function of optical properties of the test lens; and (d) positioning means responsive to said signals for altering the relative position of said light detectors and at least one of said light beam directing means and said lens holding means until the respectively associated light beam of each detector is directed toward said given portion of its area.

10. In a lensmeter:
(a) first and second light detection means, each comprising a light detector having an area capable of detecting the presence of a light beam for providing position signals indicating which portions of the detector area are subjected to a light beam and for indicating when the beam is directed toward a given portion of said area;

(b) light beam directing means for directing two light beams each at a respectively associated one of said first and second light detection means;

(c) lens holding means for interposing a test lens in the path of the light in both of said light beams such that the direction of said beams is altered as a function of optical properties of the test lens;

(d) positioning means responsive to said signals for altering the relative position of said light detectors and at least one of said light beam directing means and said lens holding means until the respectively associated light beam of each detector is directed toward said given portion of its area; and (e) said positioning means comprising means for moving the detectors together in each of two perpendicular directions transverse to the direction of said light beams, and means for moving said detectors such that they move in one direction transverse to the direction of said light beam so that the beams move oppositely relative to their respectively associated light sensors.

11. The invention defined in claim 10 in which said means for moving said detectors comprises means for producing a relative rotational displacement between said sensors and said light beam directing means on one hand and said lens holding means on the other.

12. The invention defined in claim 11 in which said light sensors comprise four sensor areas arranged in rectangular quadrants about as an origin.

13. In a lensmeter:
(a) first and second light detector means, each comprising a light detector area capable of detecting the presence of a light beam for providing position signals indicating which portions of the detector area are subjected to a light beam;

(b) means, including a mask formed with a pair of spaced perforations, for directing two light beams such that each impinges upon a respectively associated one of said first and second light detection means;

(c) lens holding means for interposing a test lens in the path of the light which forms said two light beams such that the direction of said beams is altered as a function of optical properties of the test lens; and (d) a focusing lens interposed between said mask and said lens holding means at a position such that the perforations of the mask and a test lens positioned in said lens holding means lie at conjugate distances from said focusing lens whereby the image of the test lens will appear at the position of said perforations.

14. The invention defined in claim 13 in which said light detector means include means for providing signals indicative of whether or not said light beams lie along a given line extending over the surface of its respectively associated light detector; and which further comprises means for displacing at least one of said test lens or said sensors, in response to said signals, until each light beam falls on said given line of its respectively associated light sensor.

15. In a lensmeter:
(a) first and second light detection means, each comprising a light detector having an area capable of detecting the presence of a light beam for providing signals indicating which portions of the detector area are subjected to the light beam and for indicating when the beam is directed toward a given portion of said area;

(b) light beam directing means comprising a mask formed with two perforations for directing two light beams each at a respectively associated one of said first and second light detection means;

(c) a lens holding means for interposing a test lens in the light that forms said light beams such that the direction of said beams is altered as a function of the spherical properties of the test lens;

(d) said light beam directing means further comprising a focusing lens positioned between said lens holding means and said mask such that a test lens held in said lens holding means and said perforations lie at conjugate distances from said focusing lens whereby an image of the test lens appears at the position of said perforations; and (e) means for moving said light beams and said light sensors relative to one another such that each light beam impinges upon said given portion of the area of its respectively associated light sensor.

16. The invention defined in claim 15 in which said means for moving said light beams and light sensors relative to one another comprises means for rotating said test lens.

17. The invention defined in claim 15 in which said means for moving said light beams and light sensors relative to one another comprises means for rotating said light sensors.

18. The invention defined in claim 15 in which said means for moving said light beams and said light sensors relative to one another comprises means for moving said light sensors together in each of two perpendicular directions in a plane transverse to an axis extending between said light beams and for moving said sensors in a direction such that their respectively associated light beams move in opposite directions relative to their respectively associated light sensors.

19. The invention defined in claim 15 in which said means for moving said light beams and said sensors relative to one another comprises means for rotating said mask.

20. A method of determining the parameters of a test lens with the aid of beam forming apparatus, arranged to form two light beams, and with sensing apparatus capable of sensing the relative spatial position of those two beams, which method comprises the steps of:

(a) radiating light from a single source through a test lens;

(b) causing said beam forming apparatus to form two identifiable beams of light from the source after the light has passed through said test lens;

(c) determining the relative spatial position of said beams in the absence of a test lens with the aid of said sensing apparatus; and (d) determining the amount of change in the position, one relative to the other two, of the beam forming apparatus, the sensing apparatus, and the test lens which is required to position the beams so that they have the same relative spatial position that they had in the absence of the test lens.

21. The method defined in claim 20 in which the step of determining the amount of change is accomplished by determining the spatial position of the beams before and after traversing the test lens and computing the difference in the spatial positions of the beams before and after having traversed the test lens.

22. The method defined in claim 20 which includes the further steps of:

causing said beams to pass through a focal point after passing through the test lens, and in which the spatial position of the beams are determined after they have passed through the focal point.

23. A method of determining parameters of a test lens with the aid of beam forming apparatus for forming two light beams and sensing apparatus capable of sensing the relative spatial position of those two beams, which method comprises the steps of:

(a) radiating light from a source;

(b) causing said beam forming apparatus to form two identifiable beams of the light from the source;

(c) determining the relative spatial position of said beams in the absence of a test lens with the aid of said sensing apparatus;

(d) interposing a test lens in the path of said two beams;

(e) determining the amount of change in the position of one relative to the other two of the beam forming apparatus, the sensing apparatus, and the test lens which is required to position the beams so that they have the same relative spatial positions that they had in the absence of the test lens; and (f) including the further step of causing said beams to pass through a focal point after passing through the test lens and determining the spatial position of the beams after having passed through the focal point;

(g) said beams being formed such that their paths, in the absence of a test lens, lie symmetrically positioned on opposite sides of a straight line; and (h) the step of determining being conducted so as to find a change in the spatial positions of said beams relative to said line.

* * * * *